US008635221B2

(12) United States Patent  
Salazar

(10) Patent No.: US 8,635,221 B2  
(45) Date of Patent: Jan. 21, 2014

(54) METHOD, SYSTEM, AND PROGRAM PRODUCT FOR MANAGING ACCESS TO DATA ITEMS IN A DATABASE

(75) Inventor: Fernando J. Salazar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 2116 days.

(21) Appl. No.: 10/324,612

(22) Filed: Dec. 20, 2002

(65) Prior Publication Data

US 2004/0122792 A1 Jun. 24, 2004

(51) Int. Cl.
 *G06F 17/00* (2006.01)
(52) U.S. Cl.
 USPC ............ 707/737; 707/790; 707/687; 707/821
(58) Field of Classification Search
 USPC ............ 707/4–10, 102–104.1, 687, 737, 790, 707/821
 See application file for complete search history.

(56) References Cited

U.S. PATENT DOCUMENTS

| 5,335,346 | A | | 8/1994 | Fabbio |
|---|---|---|---|---|
| 5,905,984 | A | * | 5/1999 | Thorsen ........................... 707/9 |
| 5,941,947 | A | | 8/1999 | Brown et al. |
| 5,999,978 | A | * | 12/1999 | Angal et al. .................. 709/229 |
| 6,085,191 | A | * | 7/2000 | Fisher et al. .................. 707/737 |
| 6,236,996 | B1 | | 5/2001 | Bapat et al. |
| 6,353,817 | B1 | | 3/2002 | Jacobs et al. |
| 6,446,069 | B1 | * | 9/2002 | Yaung et al. .................. 707/600 |
| 6,640,229 | B1 | * | 10/2003 | Gilmour et al. .................. 707/9 |
| 6,691,113 | B1 | * | 2/2004 | Harrison et al. ............... 707/10 |

\* cited by examiner

*Primary Examiner* — Sana Al Hashemi  
(74) *Attorney, Agent, or Firm* — Edward Choi; Hoffman Warnick LLC

(57) ABSTRACT

The invention manages access to data items in a database that are arranged into a hierarchy of nodes. One or more access entries are associated with the hierarchy of nodes to associate a user property with an access level. Access to the data items is managed by matching one or more particular user properties associated with a user requesting the access to a user property in an access entry.

10 Claims, 5 Drawing Sheets

METHOD, SYSTEM, AND PROGRAM PRODUCT FOR MANAGING ACCESS TO DATA ITEMS IN A DATABASE

BACKGROUND OF THE INVENTION

1. Field of the Invention

In general, the invention provides a method, system, and program product for managing access to data items in a database. Specifically, the invention manages access to data items arranged into a hierarchy of nodes based on access entries associated with the hierarchy of nodes and one or more user properties of an accessing user.

2. Background Art

It is often desirable to maintain various types of data in a hierarchical structure. For example, a catalog of products can be represented in a hierarchy (i.e., clothes/men/winter/gloves, etc.). Further, a relational database management system (RDBMS) is often desired to manage the data. As a result, several solutions have been proposed for maintaining data in a hierarchical structure within a relational database.

In multi-user environments, users may be granted varied access rights to access/modify data in the hierarchical structure. For example, one user may have rights to read or modify data, while another user may only be able to read data. In existing systems, access control is generally performed at a system level by the operating system. However, it is often desirable to perform access control at an application level, based on a user identification or other user property. Managing access control at this level allows applications to fine-tune the access-control scheme to their needs. However, current application-level implementations require the inclusion of operation-specific data filtering capability at various locations in the application that perform operations on the data stored in the relational database.

As a result, there exists a need for a simplified method, system, and program product that efficiently manages access to data in a relational database above the system level.

SUMMARY OF THE INVENTION

In general, the invention provides a method, system, and program product for managing access to data items in a database. Specifically, the invention allows access to data items arranged into a hierarchy of nodes to be managed based on a user property. In a typical embodiment, one or more access entries are associated with the hierarchy of nodes. Each access entry associates a user property with an access level. The user property employed can be any way of uniquely identifying a set (e.g., one or more) of users. For example, the user property can be a specific directory expression/path in a hierarchy in which the user(s) are listed, a group designation of the user(s), an attribute of the user(s), etc. In any event, the user property is associated with an access level that defines the allowed access to data for that user. When an authorized user accesses an application that processes or otherwise provides access to the data, the user is matched with his/her particular user property (e.g., based on log-in information). Upon being matched, the particular user property and one or more access entries are used to manage access to the data items. For example, the access entries are used to construct efficient SQL queries that return only accessible data items to the application. Thus, the invention provides a more flexible, and efficient implementation of managing access to data items arranged into a hierarchy of nodes.

A first aspect of the invention provides a method for managing access to data items, comprising: providing a relational database having data items arranged into a hierarchy of nodes; associating at least one access entry with the hierarchy of nodes, wherein each of the at least one access entry associates a user property with an access level; and managing access to the data items based on the at least one access entry and a property associated with a user requesting the access.

A second aspect of the invention provides method for managing access to data items, comprising: providing a relational database having data items arranged into a hierarchy of nodes; associating access entries with the hierarchy of nodes, wherein each of the access entries is based on a user property and an access level; receiving a request to access at least one of the data items from a requesting user; generating a query to return only data items that the requesting user has been granted access; and processing the query using the access entries and a user property associated with the requesting user.

A third aspect of the invention provides a system for managing access to data items, comprising an access system for processing a request to access the data items, wherein the data items are arranged into a hierarchy of nodes within a relational database, wherein access entries are associated with the hierarchy of nodes, wherein each of the access entries associates a user property with an access level, and wherein the request is filtered by matching a property associated with a user making the request with a user property in one of the access entries.

A fourth aspect of the invention provides a program product stored on a recordable medium for managing access to data items, which when executed, comprises program code for processing a request to access the data items, wherein the data items are arranged into a hierarchy of nodes within a relational database, wherein access entries are associated with the hierarchy of nodes, wherein each of the access entries associates a user property with an access level, and wherein the request is processed by matching a property associated with a user making the request with a user property in one of the access entries.

BRIEF DESCRIPTION OF THE DRAWINGS

These and other features of this invention will be more readily understood from the following detailed description of the various aspects of the invention taken in conjunction with the accompanying drawings in which.

Figure 1:
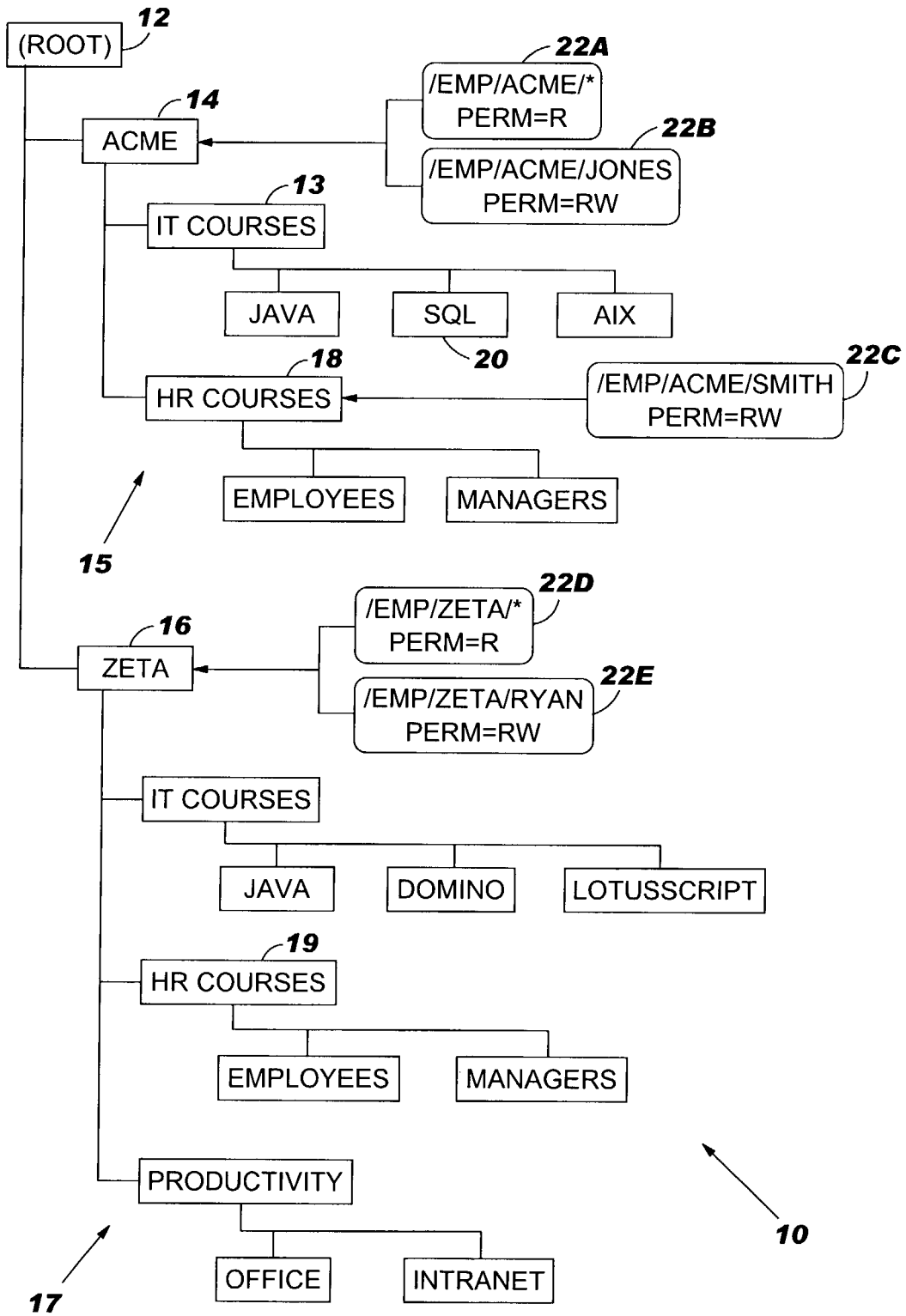
FIG. 1 depicts an illustrative example of a hierarchy of nodes.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the invention provides a method, system, and program product for managing access to data items in a database. Specifically, the invention allows efficiently processed access to data items arranged into a hierarchy of nodes to be managed based on a user property. In a typical embodiment, one or more access entries are associated with the hierarchy of nodes. Each access entry associates a user property with an access level. The user property employed can be any way of uniquely identifying a set (e.g., one or more) of users. For example, the user property can be a specific directory expression/path in a hierarchy in which the user(s) are listed, a group designation of the user(s), an attribute of the user(s), etc. In any event, the user property is associated with an access level that defines the allowed access to data for that user. When an authorized user accesses an application that processes or otherwise provides access to the data, the user is matched with his/her particular user property (e.g., based on log-in information). Upon being matched, the particular user property and one or more access entries are used to manage access to the data items. Specifically, under the present invention, SQL queries are generated to efficiently return only data items meeting the specified access level for the requesting user, without subsequent filtering to discard inaccessible data items. Thus, the invention provides a more flexible, and efficient implementation of managing access to data items arranged into a hierarchy of nodes.

Referring now to FIG. 1, an illustrative example of a hierarchy of nodes 10 is depicted. A typical hierarchy of nodes includes a "root node" that is the initial (or top) node of the hierarchy. The root node has one or more "child nodes" that are located at the level immediately below the root node. The root node is called the "parent node" of the child nodes. A set of nodes that share the same parent node are called "sibling nodes." Further levels of the hierarchy can be obtained by adding child nodes at the lowest level of the hierarchy, as is well understood in the art. To access a node, the hierarchy can be traversed by starting with the root node and following child nodes until the desired node is located. The nodes that are followed are called "edge nodes" and comprise the "path" to the desired node.

Hierarchy of nodes 10 includes a root node 12 at the "top" of the hierarchy. Root node 12 can be used to combine a plurality of individual hierarchies into a single hierarchy by making the top node (or root node) of each individual hierarchy a child node of root node 12. In this example, hierarchy of nodes 10 shows academic course offerings for two divisions of an organization, ACME and ZETA. All ACME course offerings are categorized according to a hierarchy of nodes 15 under ACME node 14. Similarly, all ZETA course offerings are categorized according to a hierarchy of nodes 17 under ZETA node 16. Root node 12 is the parent node of both ACME node 14 and ZETA node 16.

Most data items are typically associated with a node at the lowest level of the hierarchy of nodes 10. For example, all data items representing courses on the standard query language (SQL) would be associated with SQL node 20. To locate one or more of the SQL courses, root node 12 would first be accessed and ACME node 14 would be located. Then the IT COURSES node 13 would be accessed, and SQL node 20 located. SQL node 20 would include one or more child nodes for courses related to SQL, allowing the data item representing the particular course to be located. To this extent, it is understood that any node in hierarchy of nodes 10 can have one or more data items associated with it.

While hierarchy of nodes 10 is useful in categorizing data items so that they can be efficiently located and retrieved, it is often desirable to manage access to some or all of the data items. For example, a user belonging to the ACME division of the corporation should only have access to data items that are located within ACME hierarchy 15. Similarly, a user belonging to the ZETA division should only have access to data items located within ZETA hierarchy 17. Still yet, users belonging to a particular division may also be granted various levels of access (i.e., read only, read/write, etc.) and/or may only have access to certain portions of their division's hierarchy.

To manage access to the data items, one or more access entries 22A-E are associated with hierarchy of nodes 10. Each access entry 22A-E associates a user property with an access level as discussed further below. The user property can be any property associated with a set of users such as a path/directory, a group designation, a user attribute, etc., and is stored as a property string in each access entry 22A-E. For example, the user property could comprise the specific path/directory expression that corresponds to a user's exact directory path and name (e.g., /EMP/ACME/JONES), or it could contain an expression that corresponds to a node in the directory tree (e.g., /EMP/ACME) that is the parent directory for a group of users that includes the user.

Figure 2:
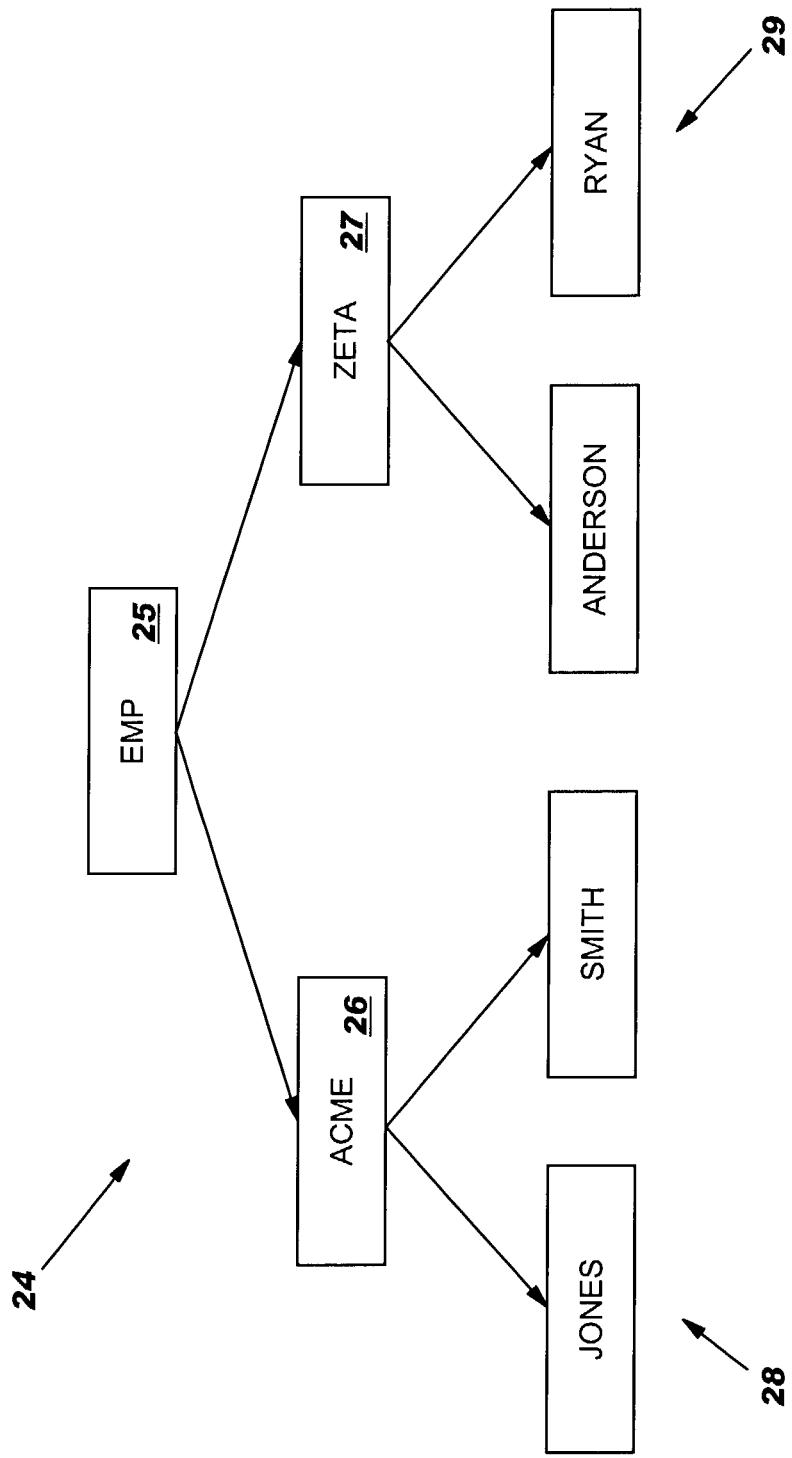
FIG. 2 depicts an illustrative hierarchical directory structure.

FIG. 2 depicts an illustrative hierarchical directory structure 24 for users in an organization. An EMP directory 25 is the parent directory for all users. Beneath EMP directory 25, ACME directory 26 and ZETA directory 27 are provided for two groups within the organization. Personal directories 28 for users within the ACME division are located under ACME directory 26, and personal directories 29 for users within the ZETA division are located under ZETA directory 27. When a user is initially identified to a computing system, (i.e., the user logs onto the system using a user name and password), the appropriate personal directory 28, 29 and/or parent directory 26, 27 can be associated with the user.

Referring to both FIGS. 1 and 2, access entries 22A-E can use hierarchical directory structure 24 to manage access to data items within hierarchy of nodes 10. As shown in FIG. 1, access entries 22A-E are each defined and associated with a node within hierarchy of nodes 10. To reduce the number of access entries 22A-E that are required, access entries 22A-E can be associated with edge nodes rather than each data item. In this case, it is understood that the same access level is granted for all nodes and data items located within the subtree having the associated node as its root. For example, access entry 22A is associated with ACME node 14. As such, the access and permissions of all ACME users are defined. In the current embodiment, each access entry 22A-E includes a property string that is based on a user property, and an access level that defines the type of access allowed for a group of users defined by the property string. While the discussion is limited to using property strings to match user properties with access levels, it is understood that this is only illustrative, and any system or method of matching user properties with access levels is covered by the invention.

Access entries 22A-E are used to grant access to data items located within the hierarchy of nodes by limiting access to those data items that the user has a sufficient access level to process. For example, access entry 22A associates the property string "/EMP/ACME/*" (that is based on a parent directory for a group of users) with a "read only" access level (i.e., "PERM=R"). A wildcard character of "*" is used at the end of the string to indicate that any content can follow, and a match will be provided. As a result, any users with a personal directory under ACME directory 26 (i.e., JONES and SMITH), can only read data items located within ACME hierarchy 15. Access entry 22B is also associated with ACME node 14. Access entry 22B associates the property string "/EMP/ACME/JONES" with a "read/write" access level (i.e., "PERM=RW"). As a result, a single user (JONES) is allowed to read/write all data items located in ACME hierarchy 15. As further shown, access entry 22C allows user SMITH to read/write data items located under HR COURSES node 18. This precludes SMITH from being able to write to any other courses located outside the subtree having HR COURSES node 18 as its root node. In the current example, "write" access typically allows a user to add, modify, or delete data items. However, it is understood that various access levels can be implemented for allowing a user to perform some or all of the operations. Because user JONES is part of ACME division, he/she matches the user property of both access entries 22A and 22B. To determine which access level is applied, any rule can be implemented. For example, access entries 22A, 22B can be assigned a certain priority, an access entry 22 including the most characters can be used, a matching string that includes no wild cards can be used, the access levels can be combined, etc.

Access entries 22A-E and hierarchy of nodes 10 provide the ability to generate SQL queries that only return data items to which a requesting user was granted access. As a result, additional filtering of inaccessible data items in the application is not necessary. For example, an application can request all HR courses. When the requesting user has a personal directory under ACME directory 26, the data items located under HR COURSES node 18 are returned. Similarly, when the requesting user has a personal directory under ZETA directory 27, the data items located under HR COURSES node 19 are returned. Therefore, the application does not perform any subsequent filtering of inaccessible data items.

Figure 3:
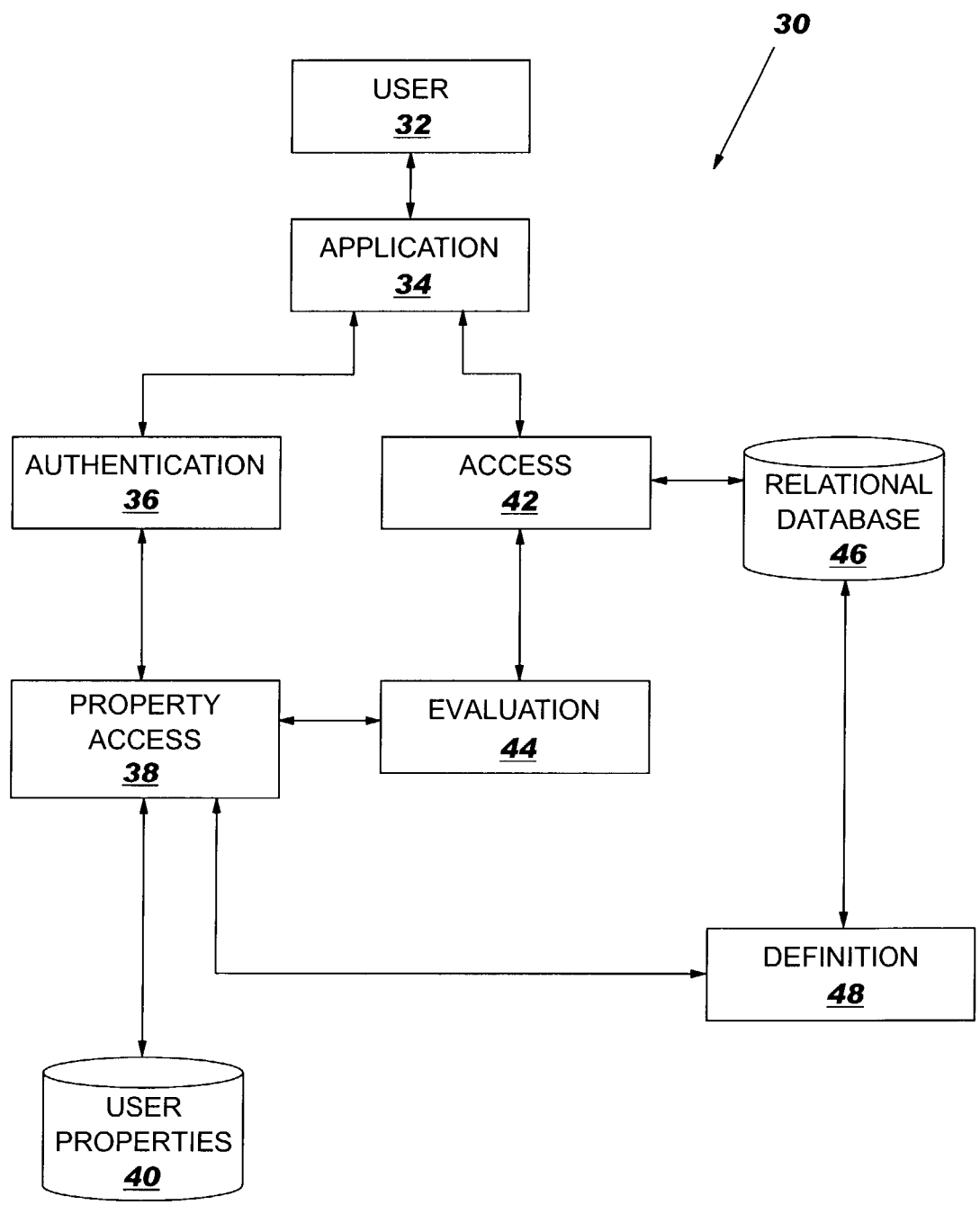
FIG. 3 depicts an illustrative system implementing the invention.

FIG. 3 depicts an illustrative embodiment of a system 30 for managing access to data items arranged into a hierarchy of nodes such as hierarchy of nodes 10 of FIG. 1. In system 30, user 32 accesses application 34, which processes or otherwise provides access to the data items. Before granting access to application 34, authentication system 36 will first "authenticate" user 32. Under the present invention, any process for authenticating user 32 now known or later developed can be implemented. For example, user 32 could provide a user name and password that are authenticated by authentication system 36. In another embodiment, using the identification of user 32, authentication system 36 could communicate with property access system 38 to obtain one or more particular user properties 40 for user 32. User properties 40 can include a "group-specific" property or a "personal" property associated with user 32. For example, user properties 40 could contain the specific path/directory expression that corresponds to user 32's exact directory path and name (e.g., /EMP/ACME/JONES), or it could contain an expression that corresponds to a node in the directory tree (e.g., /EMP/ACME) that is the parent directory for a group of users to which user 32 belongs. To this extent, users of a system can be defined in a hierarchical form as shown in FIG. 2. Only a limited number of users in the hierarchy may be granted access to application 34. Further, an anonymous user (i.e., guest user, unidentified user) may attempt to access an application 34 that requires a user identification. In either case, if user 32 does not have privilege to access application 34, application 34 can be terminated with or without providing an error message to user 32.

Once user 32 is authenticated, application 34 allows user 32 to access data items stored in relational database 46. When user 32 requests data items and/or attempts to perform an operation on data items, application 34 will "call" access system 42 to request that the operation be performed. Access system 42 determines the appropriate access level of user 32 and either performs the operation, or generates an error. When the operation is performed, access system 42 can return one or more data items to application 34. As shown, access system 42 contains or has access to relational database 46. Relational database 46 includes data items arranged into the hierarchy of nodes. As described above, one or more nodes have access entries associated therewith, and each access entry includes a property string and a corresponding access level. Access to data items and operations on the data items for user 32 will be allowed based on one or more particular user properties associated with user 32, and the access entries. As explained above, the property string for each access entry is based on one or more user properties. Typical user properties upon which the property string can be based include, for example, a path/directory expression corresponding to a position of user(s) within a hierarchy, an attribute of user(s) (e.g., user age, country), a group or department designation for user(s), a privilege level of user(s), etc. For example, if user 32 is user JONES, referred to in FIGS. 1 and 2, a property string based on a path/directory expression of user 32 could include any of: "/EMP/ACME/JONES", "/EMP/*", "/EMP/ACME/*". Under the present invention, the property string can be based on a single user property, a set of user properties, or a subset of a plurality of user properties. For example, the property string can comprise a logical expression such as "Dept=ACME and Country=USA".

In a typical embodiment, definition system 48 defines and stores (i.e., in relational database 46) the access entries. As explained above, each access entry is used to determine the appropriate access level for user 32 to access data items processed by application 34. The access level can be stored in any format desired. For example, an access entry can include a boolean value that determines whether a user is granted write access. Definition system 48 builds a property string by accessing user properties 40 (e.g., via property access system 38). Specifically, to build a property string, definition system 48 obtains one or more user properties 40 from property access system 38, which can provide the user properties as strings. Definition system 48 may then modify the returned user properties 40 to create a desired property string. For example, a portion of a user property may be removed and replaced with a wildcard ("*") indicating that any value can be provided. It is understood that any symbol, character, or system can be used to implement wildcard functionality. Those skilled in the art will recognize that regular expressions or other methods of syntactic matching can easily be applied to the processing of property strings. Alternatively, definition system 48 can define property strings without accessing user properties 40. In any event, the property string serves to associate an access level with one or more particular user properties.

As discussed above, one or more particular user properties associated with user 32 can be obtained by authentication system 36. Once obtained, the user properties can be passed to access system 42 to determine the appropriate access level of user 32. Specifically, access system 42 obtains the access entries (e.g., 22A-E) associated with the hierarchy of nodes and determines the access level of user 32 based on the one or more access entries that are matched with user 32. Access system 42 then calls evaluation system 44 and provides the properties associated with user 32 as well as all the access entries associated with the hierarchy of nodes for application 34.

Although evaluation system 44 can obtain user properties for user 32 from access system 42, evaluation system 44 may call property access system 38 itself to obtain the user properties for user 32 (e.g., determine group membership). To this extent, property access system 38 typically includes a generic interface for setting and retrieving user properties 40. In general, user properties 40 is intended to represent any manner of storing properties for one or more users. For example, user properties can be stored in a plurality of formats and/or a plurality of locations such as a system directory and a user registry. As such, an access component (not shown) for each format/location can be used to provide a generic interface to property access system 38 for reading and writing user properties. Property access system 38 also allows other systems to obtain user properties 40 without knowledge of the format/location in which a particular user property is stored. For example, user properties 40 can be communicated to/from property access system 38 as strings. Property access system 38 can perform any required format conversions between the stored value and the value communicated to/from the various systems. In another embodiment, other systems can obtain user properties 40 by accessing user properties 40 directly, without using property access system 38.

In any event, evaluation system 44 matches one or more access entries with user 32 based on the particular user properties associated with user 32 and the property strings included in each access entry. In a typical embodiment, for each access entry, evaluation system 44 determines whether the user properties of user 32 match the property string. Any means for determining a match now known or later developed can be used. For example, a property based on an exact directory of user 32 may be "/EMP/ACME/JONES". Further, a property string in an access entry may be "/EMP/ACME/*". In this case, evaluation system 44 would determine that a match exists, and return the access entry. More complex property strings may also be included in an access entry. For example, similar to a user property for user 32, a property string of an access entry may be a logical expression such as "Dept=ACME and Country=USA". Further, a property string may include an expression that is derived from one or more user properties. For example, a property string may comprise "isManager" that returns a match if user 32 is a manager. To determine if user 32 is a manager, several user properties may be required.

In any event, once evaluation system 44 has determined the appropriate matching access entry(s) for user 32, evaluation system 44 returns the access entry(s) to access system 42. In a typical embodiment, access system 42 maintains the set of access entries and associated nodes that evaluation system 44 determined match the user properties of user 32. Based on the access level in an access entry, access system 42 filters data items provided to and/or processed by application 34 in response to a request generated by application 34. In the case that a plurality of matches are found, the best match is provided, as discussed further below. If no match is found, a default access level can be provided. In any event, as will be further described below, once an access entry for user 32 is identified, it can be stored in a localized memory (e.g., a cache). This prevents the access entry from having to be re-identified and retrieved from relational database 46 when application 34 generates further requests for data items/operations on data items.

Figure 4:
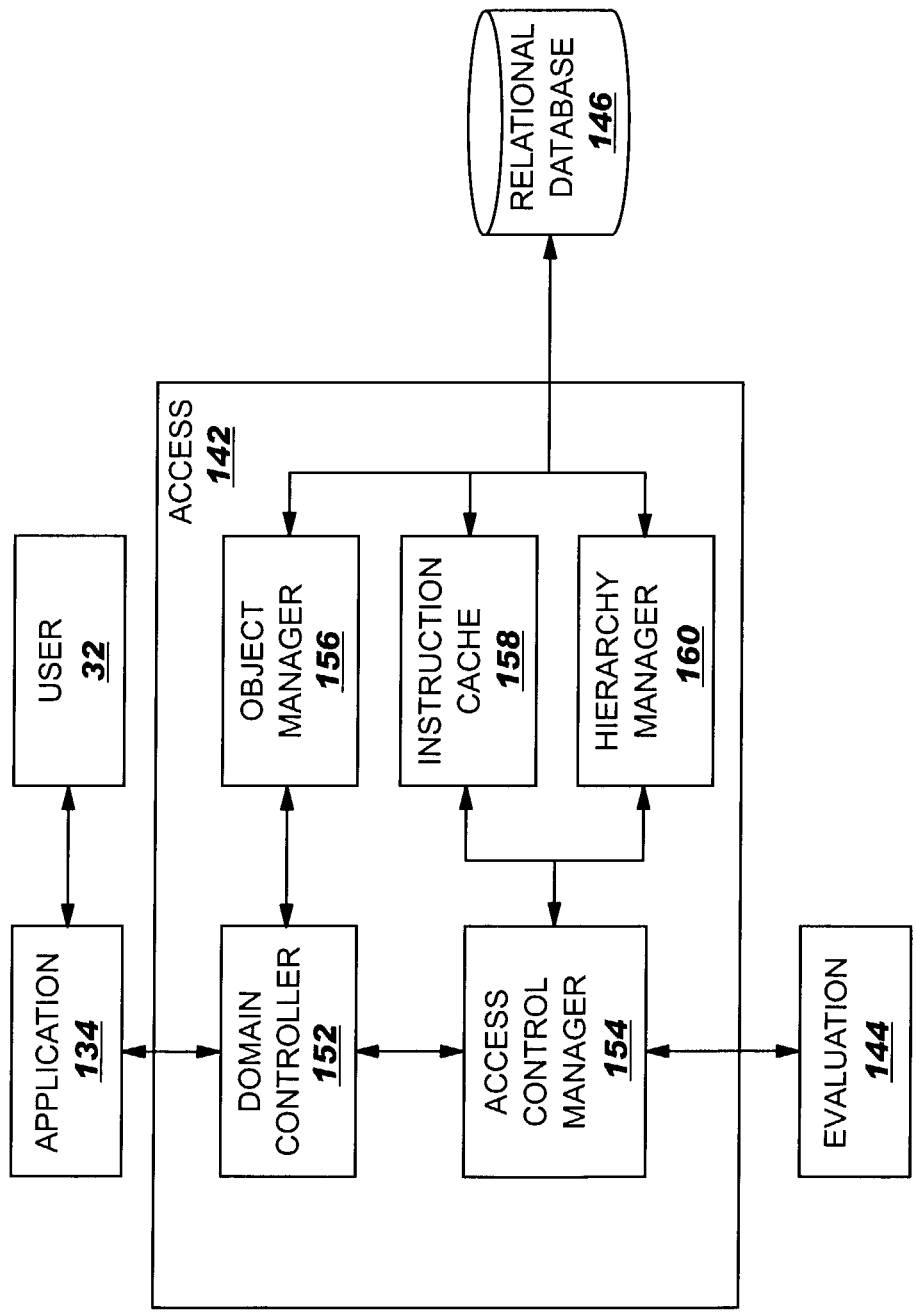
FIG. 4 depicts a detailed embodiment of the access system of FIG. 3 according to one embodiment of the invention.

Referring now to FIG. 4, a detailed embodiment of access system 142 is shown. As depicted, access system 142 includes a domain controller 152, an access control manager 154, an object manager 156, an instruction cache 158, and a hierarchy manager 160. Application 134 sends requests for operations to be performed on data items to domain controller 152. Domain controller 152 communicates with access control manager 154 and object manager 156 to implement the appropriate access level(s) for user 32 and filter the data items returned to application 134.

Application 134 can call access system 142 to perform initialization during the initialization of application 134 (i.e., when it is initially accessed, after user 32 has been authenticated, etc.) or access system 142 can perform initialization when a first data operation request (i.e., read, write, add, delete, etc.) is provided from application 134. During initialization, domain controller 152 calls access control manager 154 to generate a list of access entries and their associated nodes for user 32. Access control manager 154 calls instruction cache 158 which in turn retrieves all access entries and their associated nodes from relational database 146 and returns them to access control manager 154. Instruction cache 158 can cache the access entries and nodes so that relational database 146 does not need to be accessed should user 32 stop running application 134, and a new user can be authenticated. In any event, instruction cache 158 provides a list of all possible access entries and their associated nodes to access control manager 154, which then passes the list of access entries to evaluation system 144 to determine a set of access entries for user 32. As discussed above, application 134 may also provide access system 142 with one or more user properties associated with user 32 that can also be provided to evaluation system 144. Alternatively, evaluation system 144 can itself retrieve any required user properties. Evaluation system 144 then returns a list of access entries for user 32 to access control manager 154 based on the particular user properties and the property string contained in each access entry. Access control manager 154 then caches the list of access entries and associated nodes for user 32 or provides them to instruction cache 158 for caching. In any event, access entries do not need to be retrieved from relational database 146 and evaluation system 144 does not need to be consulted further. However, it is understood that updates to either cached list (all access entries or access entries for user 32) can be made periodically or based on an update to the access entries stored in relational database 146 being performed.

For each operation request, domain controller 152 obtains a list of nodes available to user 32 from access control manager 154. In addition to the list of access entries and associated nodes, access control manager 154 consults hierarchy manager 160 to generate the list of nodes available to user 32. Given a node, hierarchy manager 160 navigates the hierarchical structure to determine each node in the path to the given node, and/or any nodes within a subtree having the given node at its root. Depending on the operation requested, hierarchy manager 160 provides all nodes that fulfill the request to access control manager 154. Access control manager 154 then forwards the list of nodes to domain controller 152.

Using the list of nodes available to user 32, domain controller 152 determines if user 32 has a sufficient access level to perform the requested data operation. Should user 32 have a sufficient access level to perform the requested data operation, domain controller 152 generates a custom command based on the operation and the nodes for which user 32 has permission. Once domain controller 152 generates the custom command, the custom command is provided to object manager 156 which performs the command on the data items in relational database 146, and returns the result to domain controller 152. For a read operation, object manager 156 would return all the data items that were obtained from relational database 146. For a write operation (i.e., update, add, delete, etc.), object manager 156 would return whether the operation was successful. In either case, an error code may also be returned.

As examples, the operation of two typical requests are now discussed with reference to FIG. 1 in conjunction with FIG. 4. In a typical scenario, user 32 may browse information in hierarchy of nodes 10, which results in application 134 requesting data items from relational database 146. For example, application 134 may initially generate a command (SQL) to request all of the child nodes of root node 12 (i.e., SELECT <all> FROM <table> WHERE <parent=root node>). Later in browsing, more specific data items may be requested, or a single data item may be requested (i.e., SELECT <all> FROM <table> WHERE <parent=SQL node>). In either case, domain controller 152 will call access control manager 154 to obtain the list of nodes that user 32 can access. The list of nodes can be returned, for example, as a custom limitation to the operation requested by application 134. Assuming, for example, that user SMITH has been authenticated as user 32, access control manager 154 will obtain access entry 22A that is associated with node 14 and access entry 22C that is associated with node 18 from instruction cache 158. Hierarchy manager 160 can be consulted to determine that node 14 is the parent node of node 18. Since the requested data operation is a read operation and node 18 is a child node of node 14, node 14 can be used to limit the nodes returned.

In one embodiment, access control manager 154 generates and returns one or more select statements that are combined and used to access data items available to user 32 using the standard (SQL) operations INTERSECT and UNION. When SMITH is the user, the select statement could comprise: SELECT <key> FROM <table> INTERSECT (SELECT <key> FROM <tree> WHERE <node in ACME subtree>). Alternatively, the nodes associated with both access entries 22A and 22C can be used to filter the nodes returned. In this case, the UNION operation would also be used, and access control manager 154 could return: SELECT <key> FROM <table> INTERSECT (SELECT <key> FROM <tree> WHERE <node in ACME subtree> UNION SELECT <key> FROM <tree> WHERE <node in HR COURSES subtree>). Domain controller 152 could then generate a custom command that uses an INTERSECT operation to filter the data items returned to application 134 to those available to user 32. The resulting custom command could comprise, for example: SELECT <all> FROM <table> WHERE <parent=root node> INTERSECT (SELECT <all> FROM <table> WHERE <ACME node in path>). Once the custom command is generated, object manager 156 is called to retrieve data items associated with the nodes. In an alternative embodiment, access control manager 154 could generate and perform the custom command to obtain a list of object identifiers for the filtered data items, and return the list of object identifiers to domain controller 152. Domain controller 152 can then forward the list of object identifiers to object manager 156 to obtain a data item for each object identifier.

Another common data operation comprises requesting to retrieve, modify, or add a specific data item. As previously discussed, access control manager obtains the access entries and associated nodes from instruction cache 158, and uses hierarchy manager 160 to determine if user 32 has the required access level. Hierarchy manager 160 can be used to obtain the list of nodes in the path from the requested node to the root node of the tree. Instruction cache 158 can return the list of nodes that are associated with an access entry having a sufficient access level. Access control manager 154 can then compare the two lists to determine if there is any node in both lists (i.e., whether any node in the accessible set of nodes intersects the path). If there is, user 32 is granted access, if not, user 32 does not have the requested access. For example, application 134 may request to add a new SQL course or modify the title of an existing SQL course. As a result, it must be determined if user 32 has sufficient privilege to perform a write operation under SQL node 20. As with the case above, domain controller 152 would receive the requested operation (e.g., INSERT INTO <table> <new course having SQL node as parent>) from application 134 and forward it to access control manager 154 to determine if user 32 has a sufficient access level to perform the operation. Assuming user 32 is JONES, access entry 22B would be used since the requested operation is a write operation. The requested node is SQL node 20, and therefore hierarchy manager 160 would determine if ACME node 14 is in the path for SQL node 20. Since it is, access control manager would return SQL node 20 or its identifier to domain controller 152. Domain controller 152 would then call object manager 156 to perform the requested operation.

As discussed above, access entries 22A-E can be used to grant access to data items located below an associated node in hierarchy of nodes 10. Access entries 22A-E can also be used to deny access to data items located below an associated node. For example, an access entry can be associated with IT COURSES node 13 that denies access to all ACME users that are not within the IT division. As a result, although access entry 22A initially grants access to all data items under ACME node 14 for all ACME users, non-IT ACME users would be denied access to data items under IT COURSES node 13.

Similarly, while access entries 22A-E grant access to all data items located below an associated node in hierarchy of nodes 10, access entries 22A-E can grant access only to data items having a particular relationship with an associated node. For example, access entry 22B could limit the write access granted to user JONES to data items under the immediate children of ACME node 14. As a result, user JONES would not be able to write to data items located, for example, under SQL node 20. Alternatively, access entry 22B could grant write access to all grandchild nodes of the associated node. In this case, user JONES could write to data items located under SQL node 20, for example, but not write to data items located under IT COURSES node 13.

Figure 5:
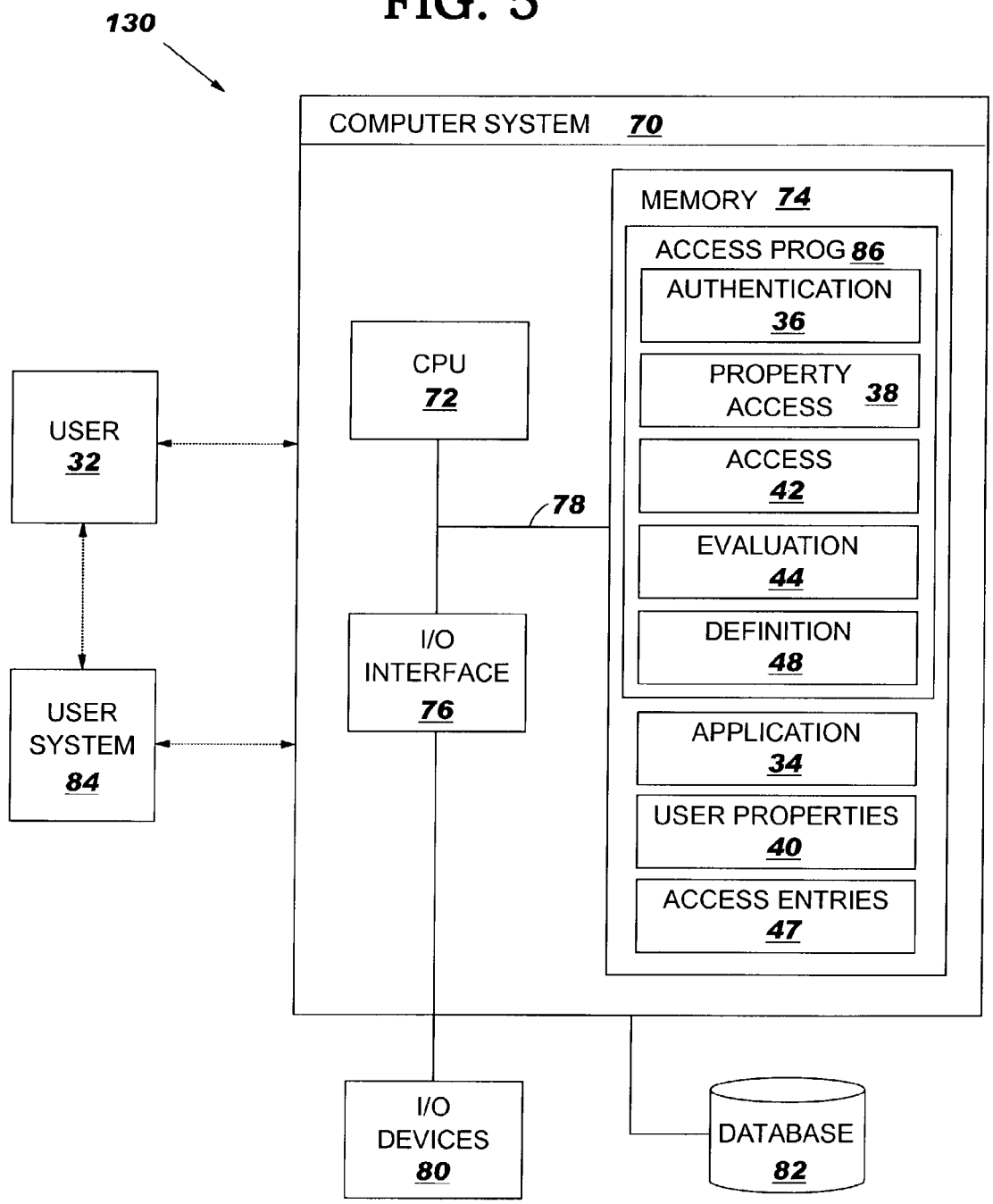
FIG. 5 depicts the system of FIG. 3 implemented in a computing environment.

FIG. 5 depicts one embodiment of a system 130 for managing access to data items implemented in a computing environment. System 130 includes a computer system 70 that generally comprises a central processing unit (CPU) 72, memory 74, input/output (I/O) interface 76, bus 78, I/O devices 80 and database 82. User 32 communicates with computer system 70 using one or more I/O devices 80 or by communicating with user system 84, which in turn communicates with computer system 70. It is understood that although not shown, user system 84 typically contains components (e.g., CPU, memory, etc.) similar to computer system 70. Such components have not been separately depicted and described for brevity purposes. In addition, it is understood that computer system 70 and user system 84 comprise any type of device capable of accepting input, providing output, and/or communicating with another device.

User system 84 communicates with computer system 70 via one or more direct hardwired connections (e.g., serial port), or via an addressable connection in a client-server (or server-server) environment, which may utilize any combination of wireline and/or wireless transmission methods. In the case of the latter, the server and client may be connected via the Internet, a wide area network (WAN), a local area network (LAN), a virtual private network (VPN), or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Computer system 70 can comprise any general purpose or specific-use system utilizing standard operating system software, which is designed to drive the operation of the particular hardware and which is compatible with other system components and I/O controllers. CPU 72 may comprise a single processing unit, multiple processing units capable of parallel operation, or be distributed across one or more processing units in one or more locations, e.g., on a client and server. Memory 74 may comprise any known type of data storage and/or transmission media, including magnetic media, optical media, random access memory (RAM), read-only memory (ROM), a data cache, a data object, etc. Moreover, similar to CPU 72, memory 74 may reside at a single physical location, comprising one or more types of data storage, or be distributed across a plurality of physical systems in various forms.

I/O interface 76 may comprise any system for exchanging information with one or more I/O devices 80, including an I/O port (serial, parallel, ethernet, keyboard, mouse, etc.), a universal serial bus (USB) port, expansion bus, integrated drive electronics (IDE), etc. I/O devices 80 may comprise any known type of input/output device capable of communicating with I/O interface 76 with or without additional devices (i.e., expansion cards), including a network system, a modem, speakers, a monitor (cathode-ray tube (CRT), liquid-crystal display (LCD), etc.), hand-held device, keyboard, mouse, voice recognition system, speech output system, scanner, printer, facsimile, pager, storage devices, etc. Bus 78 provides a communication link between each of the components in computer system 70 and likewise may comprise any known type of transmission link, including electrical, optical, wireless, etc. In addition, although not shown, additional components, such as cache memory, communication systems, system software, etc., may be incorporated into computer system 70.

Database 82 may provide storage for information necessary to carry out the present invention as described above. As such, database 82 may include one or more storage devices, such as a magnetic disk drive or an optical disk drive. Further, database 82 can include data distributed across, for example, a LAN, a WAN or a storage area network (SAN) (not shown). Database 82 may also be configured in such a way that one of ordinary skill in the art may interpret it to include one or more storage devices.

Shown in memory 74 as computer program code is access program 86, application 34, user properties 40, and access entries 47. Access program 86 is shown including authentication system 36, property access system 38, access system 42, evaluation system 44, and definition system 48. Each system shown performs the same functionality as described above with reference to FIG. 3. For example, authentication system 36 will determine whether user 32 is authorized to access application 34. As discussed above, application 34 uses access program 86 to manage the access of data items in relational database 82. Further, user properties 40 and access entries 47 are shown cached in memory 74 as discussed above. It is understood that access program 86 can be implemented including additional systems or without some of the systems shown. For example, definition system 48 can be implemented as a separate program that is loaded onto a separate computer system accessed by an administrator. Further, some or all of the systems of access program 86 can be implemented as part of a relational database management system (RDBMS).

It is understood that the invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 70 and/or user system 84 such that it carries out the methods described herein. Alternatively, a specific use computer, containing specialized hardware for carrying out one or more of the functional tasks of the invention could be utilized. The invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A method for managing access to data items, comprising:
   providing a relational database having data items arranged into a hierarchy of nodes;
   associating at least one access entry in the hierarchy of nodes directly with a node in the hierarchy of nodes, the node being a root node of a subtree in the hierarchy of nodes, wherein each of the at least one access entry associates a user property with an access level; and
   managing access to the data items based on the at least one access entry and a user property associated with a user requesting the access.

2. The method of claim 1, further comprising caching the access entries for subsequent access management.

3. The method of claim 1, further comprising receiving a request to access at least one of the data items.

4. The method of claim 1, wherein the user property for the at least one access entry is based on least one of: a directory expression, a group designation, and a user attribute.

5. The method of claim 1, further comprising authenticating the user when access to the data items is first requested.

6. The method of claim 1, further comprising:
   defining a property string for an access entry, wherein the property string is based on a user property;
   defining an access level for the access entry; and
   storing the access entry in the relational database.

7. The method of claim 3, wherein the managing step comprises:
   obtaining a set of the data items based on the request; and
   processing the obtained data items based on the access entries.

8. The method of claim 3, further comprising:
   identifying a user making the request; and
   associating the user with a particular user property, wherein managing access to the data items is further based on matching the particular user property with a user property in one of the at least one access entry.

9. The method of claim 8, wherein the particular user property is based on at least one of: a directory expression, a group designation, and a user attribute.

10. The method of claim 8, wherein the particular user property is provided from a hierarchical directory structure for users in the organization.

\* \* \* \* \*